(12) United States Patent
Chamberlain et al.

(10) Patent No.: US 9,436,605 B2
(45) Date of Patent: Sep. 6, 2016

(54) CACHE COHERENCY APPARATUS AND METHOD MINIMIZING MEMORY WRITEBACK OPERATIONS

(71) Applicant: Intel Corporation, Santa Clara, CA (US)

(72) Inventors: Jeffrey D. Chamberlain, Tracy, CA (US); Vedaraman Geetha, Fremont, CA (US); Robert G. Blankenship, Tacoma, WA (US); Yen-Cheng Liu, Portland, OR (US); Adrian C. Moga, Portland, OR (US); Herbert H. Hum, Portland, OR (US); Sailesh Kottapalli, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 128 days.

(21) Appl. No.: 14/136,131

(22) Filed: Dec. 20, 2013

(65) Prior Publication Data

US 2015/0178206 A1 Jun. 25, 2015

(51) Int. Cl.
*G06F 12/08* (2016.01)

(52) U.S. Cl.
CPC ....... *G06F 12/0817* (2013.01); *G06F 12/0815* (2013.01)

(58) Field of Classification Search
None
See application file for complete search history.

(56) References Cited

U.S. PATENT DOCUMENTS

| 5,463,565 | A | 10/1995 | Cookson et al. | |
|---|---|---|---|---|
| 6,249,846 | B1 | 6/2001 | Van Doren et al. | |
| 6,263,405 | B1 | 7/2001 | Irie et al. | |
| 6,272,603 | B1* | 8/2001 | Arimilli et al. | 711/146 |
| 7,076,613 | B2 | 7/2006 | Peir et al. | |
| 7,308,539 | B2 | 12/2007 | Fuhs et al. | |
| 8,489,822 | B2 | 7/2013 | Sun et al. | |
| 2003/0140200 | A1* | 7/2003 | Jamil et al. | 711/145 |
| 2007/0073977 | A1 | 3/2007 | Safranek et al. | |
| 2008/0320234 | A1* | 12/2008 | Sugizaki | 711/143 |
| 2011/0161585 | A1 | 6/2011 | Kottapalli et al. | |

* cited by examiner

*Primary Examiner* — Jared Rutz
*Assistant Examiner* — William E Baughman
(74) *Attorney, Agent, or Firm* — Nicholson De Vos Webster & Elliott LLP

(57) ABSTRACT

An apparatus and method for reducing or eliminating writeback operations. For example, one embodiment of a method comprises: detecting a first operation associated with a cache line at a first requestor cache; detecting that the cache line exists in a first cache in a modified (M) state; forwarding the cache line from the first cache to the first requestor cache and storing the cache line in the first requestor cache in a second modified (M') state; detecting a second operation associated with the cache line at a second requestor; responsively forwarding the cache line from the first requestor cache to the second requestor cache and storing the cache line in the second requestor cache in an owned (O) state if the cache line has not been modified in the first requestor cache; and setting the cache line to a shared (S) state in the first requestor cache.

19 Claims, 15 Drawing Sheets

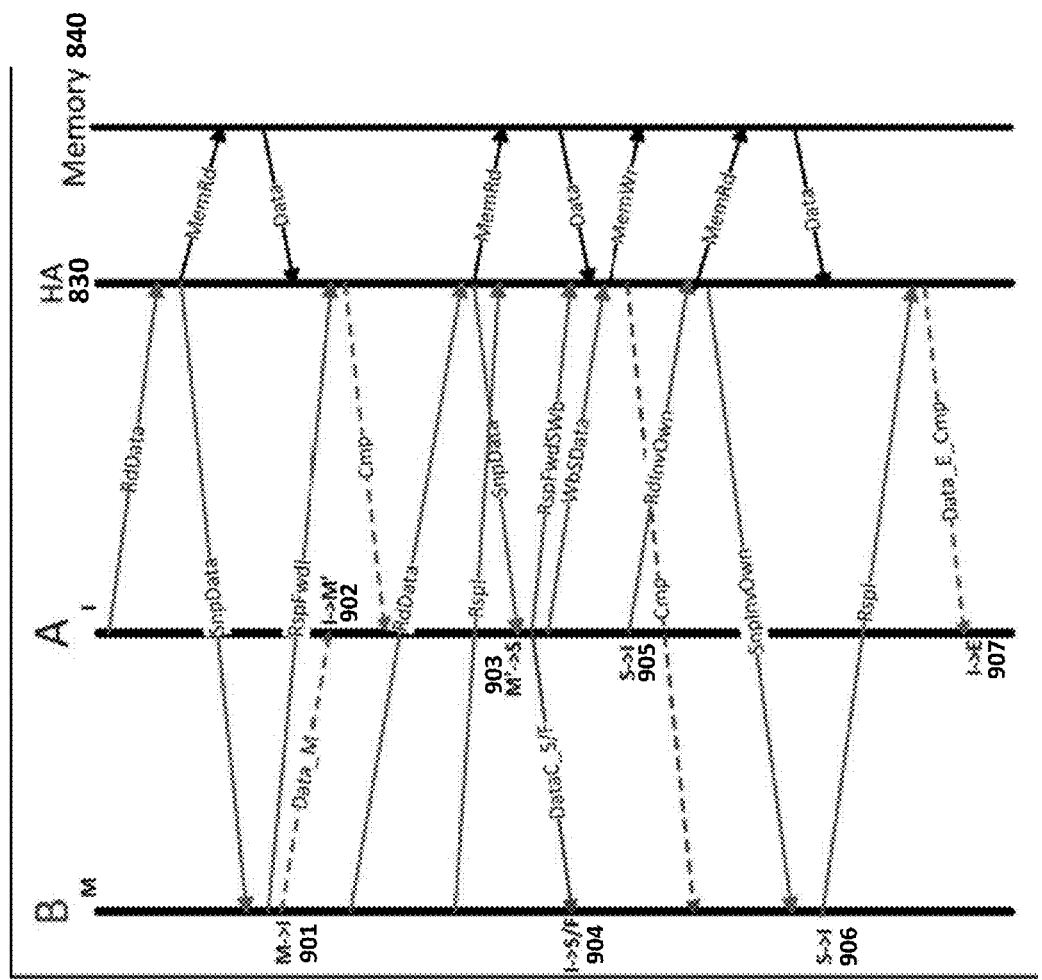

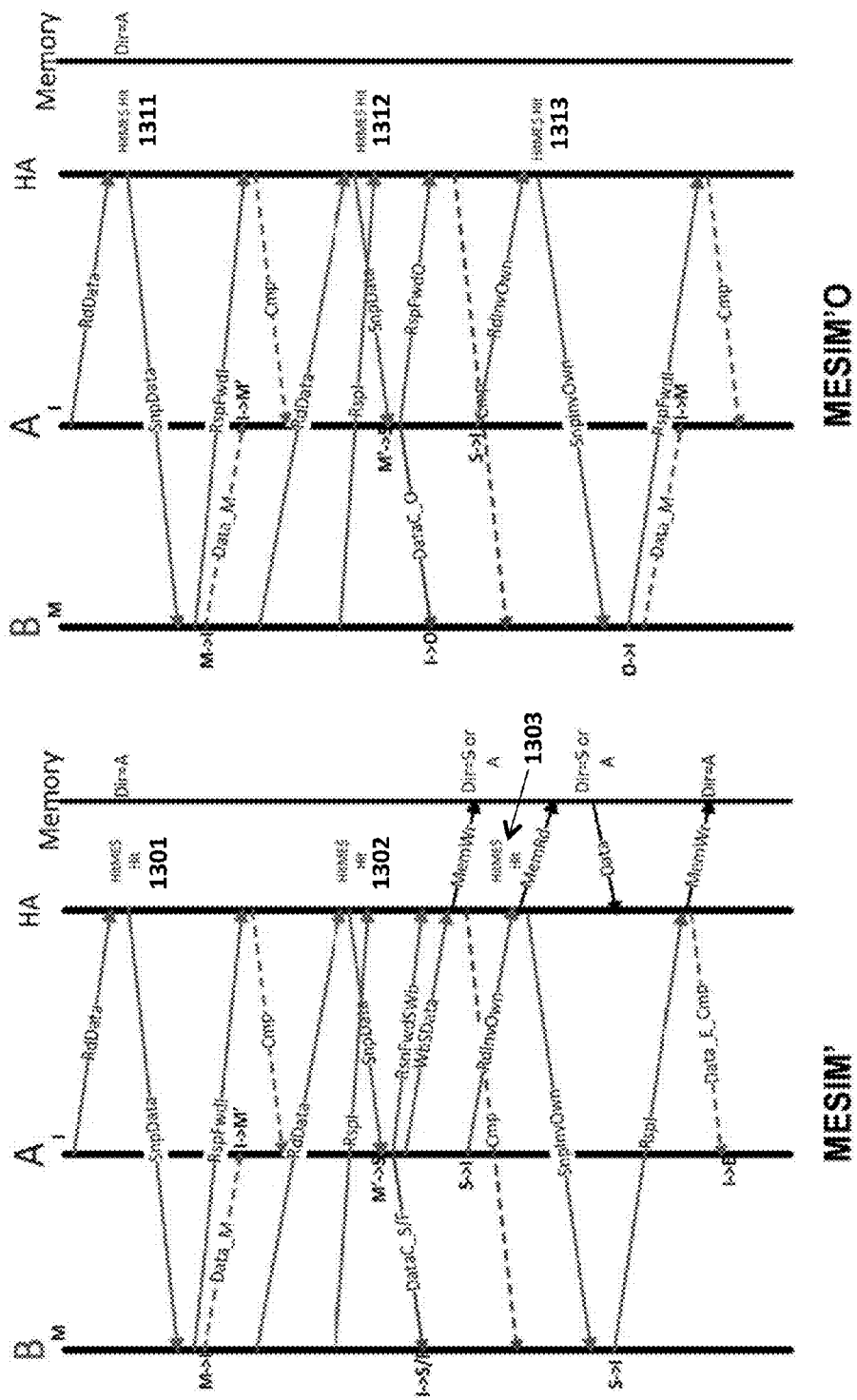

CACHE COHERENCY APPARATUS AND
METHOD MINIMIZING MEMORY
WRITEBACK OPERATIONS

BACKGROUND

1. Field of the Invention

This invention relates generally to the field of computer processors. More particularly, the invention relates to a cache coherency apparatus and method for minimizing memory writeback operations.

2. Description of the Related Art

The most popular multi-socket cache coherence protocols used today are MESI (Modified Exclusive Shared Invalid), MOESI (Modified Owned Exclusive Shared Invalid), and MESIM' (where the M' state designates a modified line which has been read by a peer but is not immediately written back to memory). MESI and MESIM' both have the advantage of providing exclusive ownership to the first socket to read a line after receiving a dirty snoop response from another socket that recently wrote its copy of the line.

The benefit that MESIM' has over MESI is that MESI requires the line to be immediately be written to memory before providing exclusive ownership to the first reader, while the M' state of MESIM' allows that write-back to memory to be delayed until a second read (by some other socket) occurs. However, if there is more than a single reader after each writer, both MESI and MESIM' will eventually write the dirty data for each write to memory.

MOESI, on the other hand, can eliminate the write-back to memory. For example, the "Owned" (O) state indicates that the owner is one of several valid copies of the cache line, but has the exclusive right to make changes to it. It must broadcast any changes to all other caches sharing the line. The introduction of Owned state allows dirty sharing of data because a modified cache line can be moved between various caches without writing back the cache line to main memory. The cache line may be changed to the Modified state after invalidating all shared copies, or changed to the Shared state by writing the modifications back to main memory. However, MOESI does not allow the first reader after each writer to get an exclusive copy of the line, which can degrade performance on some Online Transaction Processing (OLTP) workloads.

BRIEF DESCRIPTION OF THE DRAWINGS

A better understanding of the present invention can be obtained from the following detailed description in conjunction with the following drawings, in which:

FIG. 9 is a transaction diagram illustrating one embodiment of an MESIM' implementation;

FIGS. 13A-B are transaction diagrams showing a reduction in memory access resulting from a directory cache.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
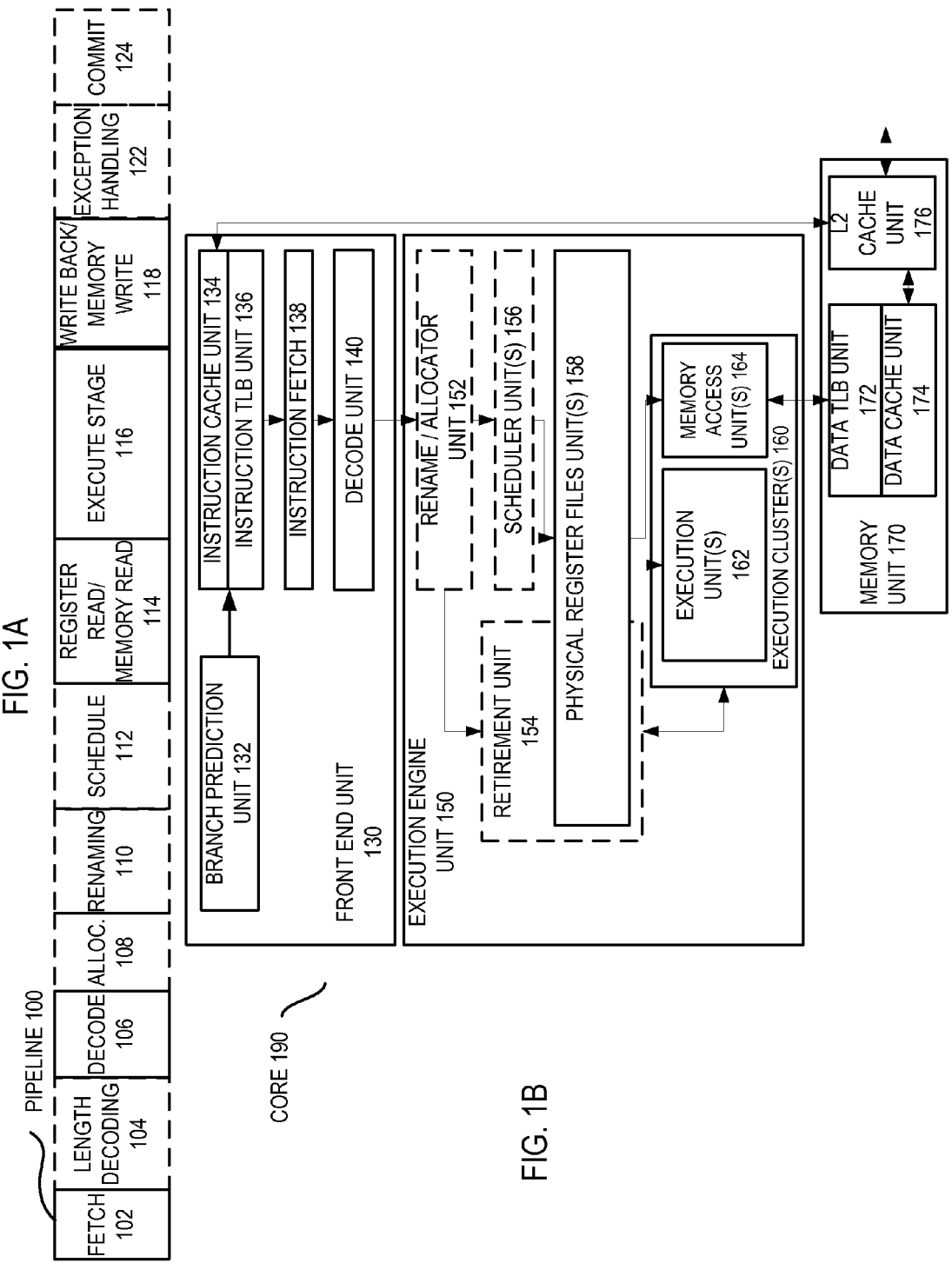
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
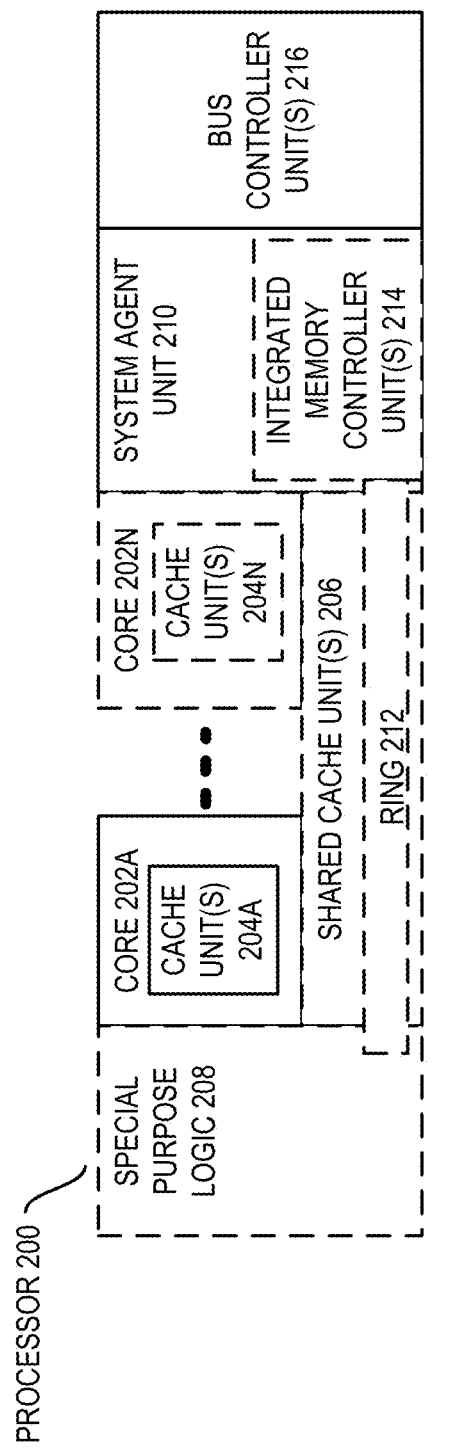
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
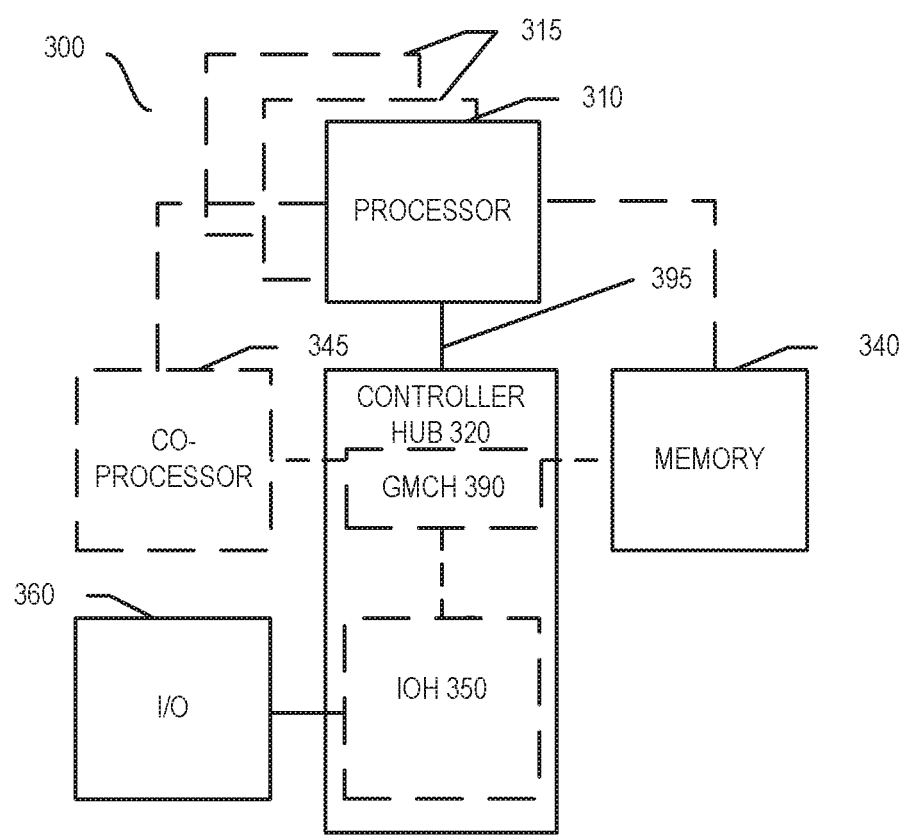
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
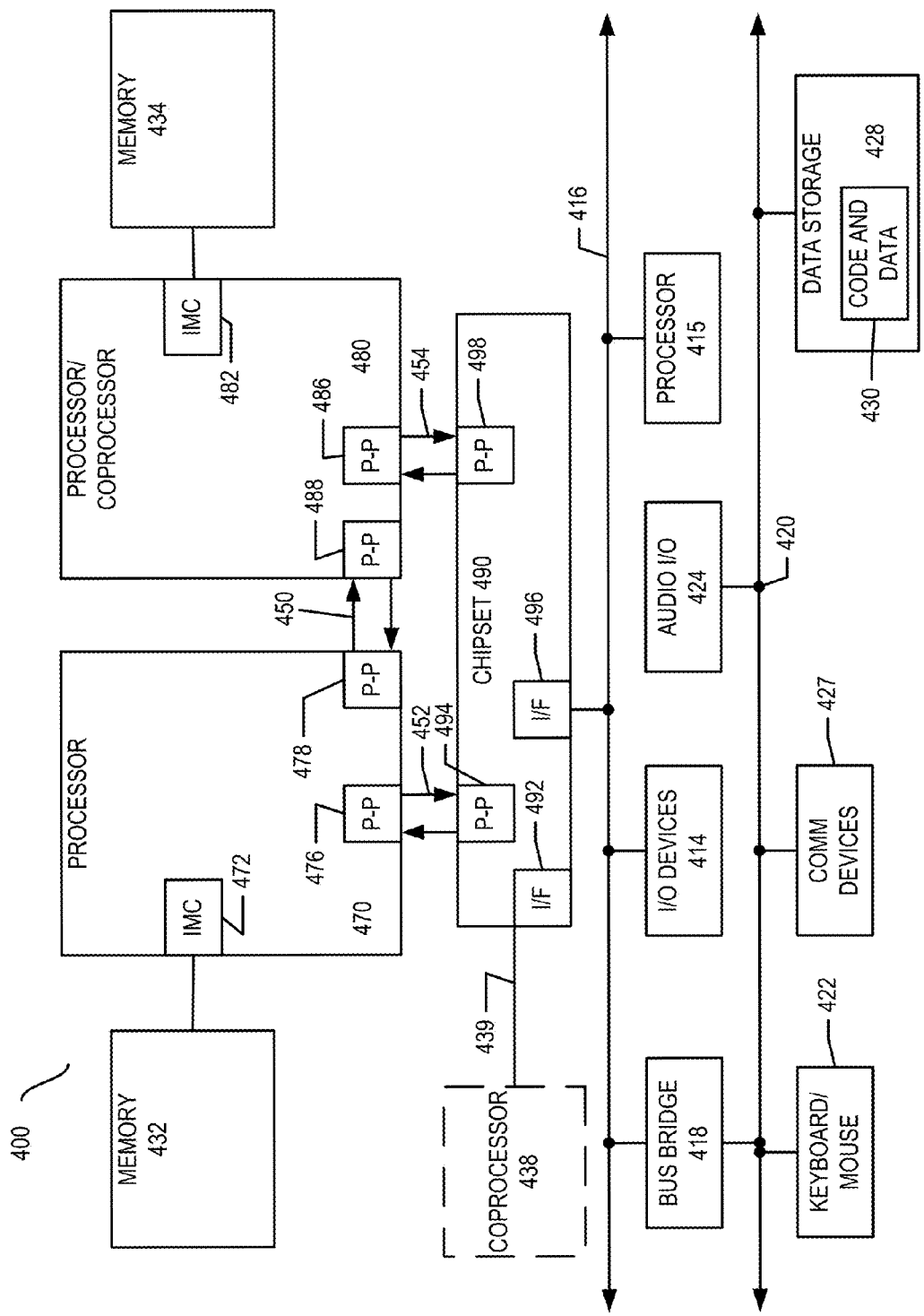
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
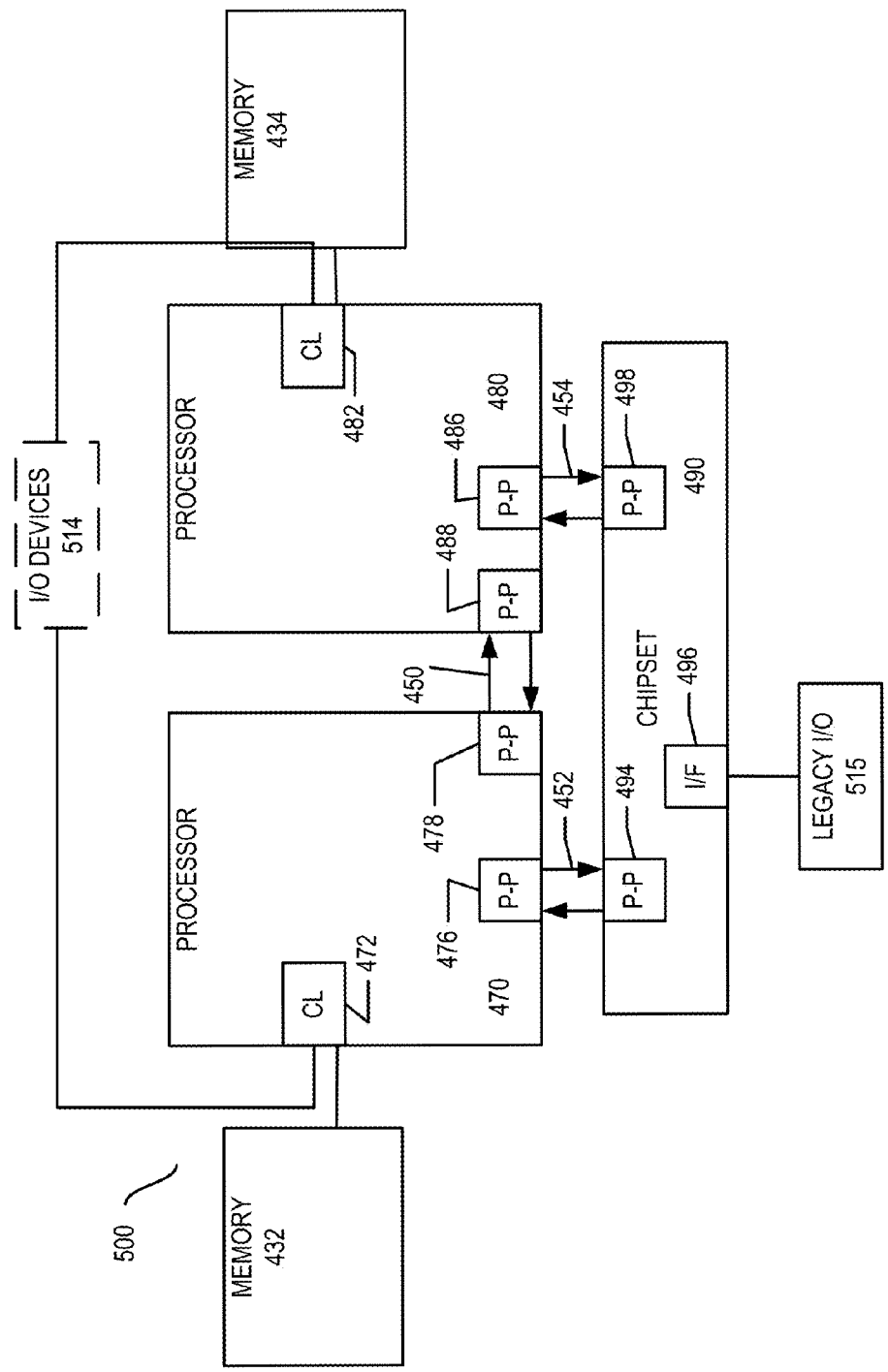
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
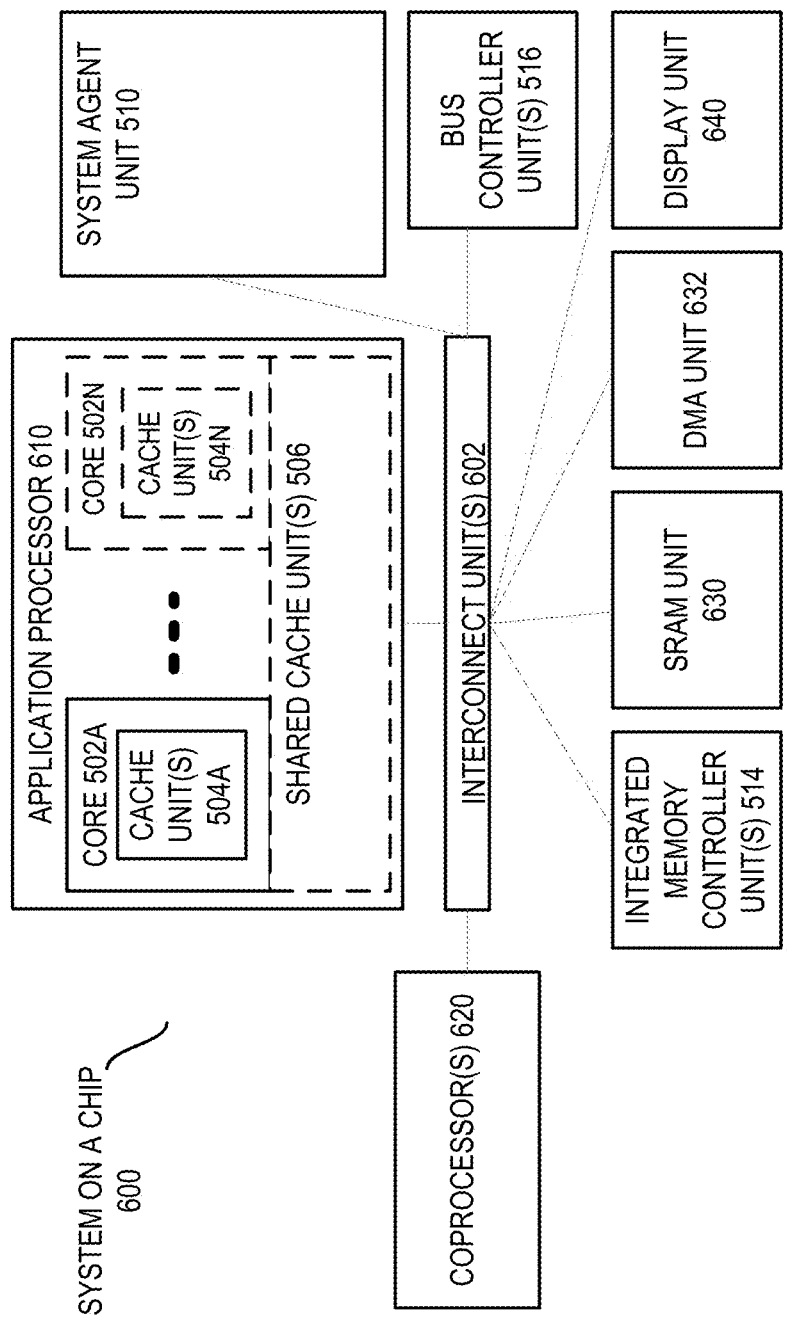
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
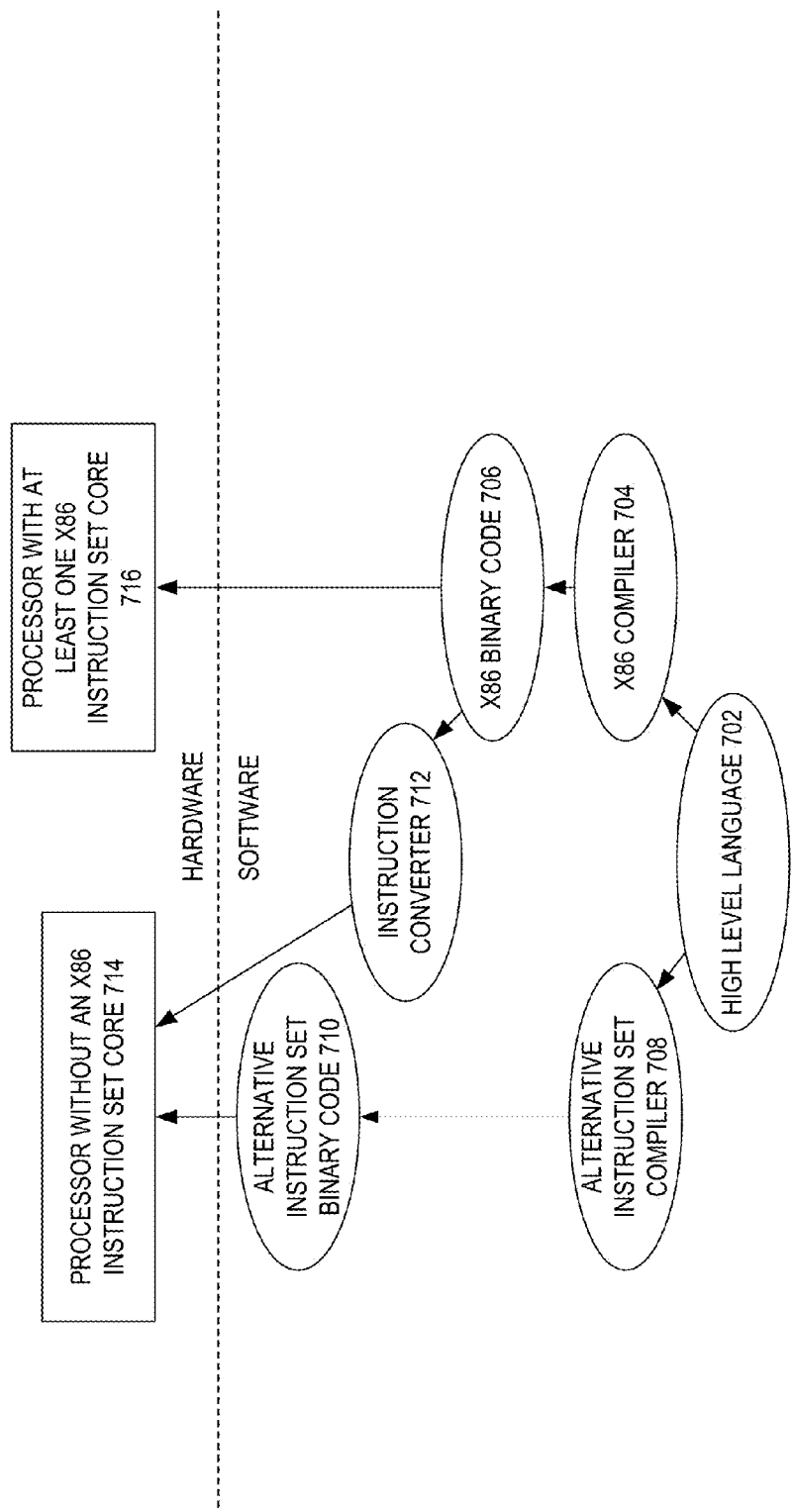
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alt ernative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Cache Coherency Apparatus and Method Minimizing Memory Writeback Operations

The embodiments of the invention described herein provide for efficient processing of load requests that hit modified data in a peer cache, which also reduces write-backs of the dirty data to memory. One embodiment combines the benefits of MOESI and MESIM' by adding an M' state to the MOESI protocol. The M' state provides the performance benefit of providing the first reader an Exclusive (E) copy of the data, while the Owned (O) state allows the processor to potentially delay the write-back to memory indefinitely. The former maintains nominal performance on server workloads where multi-writer sequences are originating while the latter maximizes the potential savings on memory bandwidth and power on single-writer-multi-reader sequences.

In addition, one embodiment of the invention enhances the traditional cache coherence protocols that minimize extraneous writes to memory for shared cache lines which are intermittently written by the software threads running on the system (potentially reducing the writes to memory to zero), without sacrificing the performance benefits already inherent in existing cache coherence protocols. In one embodiment, it improves upon MESIM' by enabling MESIM' to delay the write back to memory indefinitely for a shared line that is periodically written, if that line is hot enough to never be evicted from the last level cache. In one embodiment, it improves upon MOESI, by giving MOESI an intermediate state between M and O (M') which allows MOESI to delay the transition from modified to shared until after it is confirmed that the first reader does not also want to write the cache line.

Figure 8A:
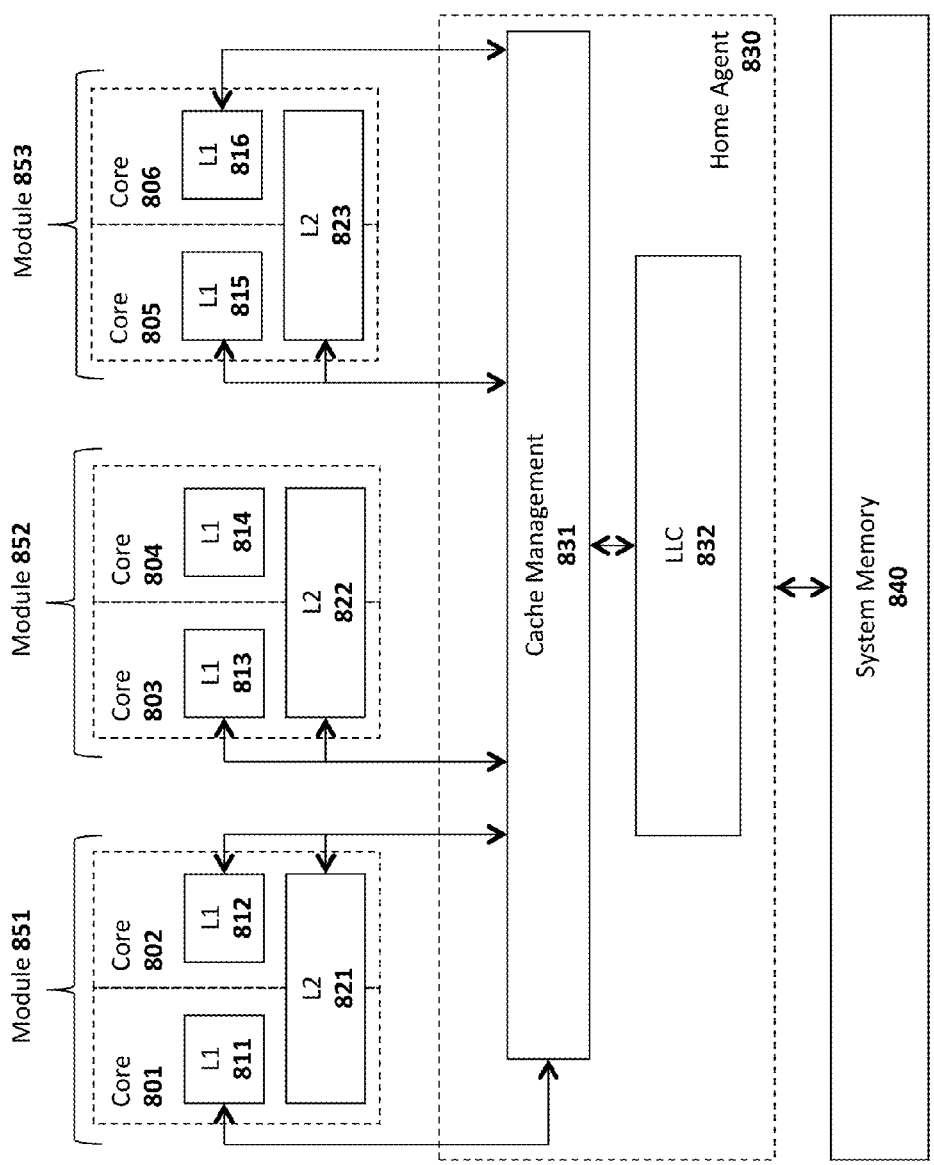
FIGS. 8A-C illustrate different exemplary multi-core and hierarchical cache arrangements.
Figure 8B:
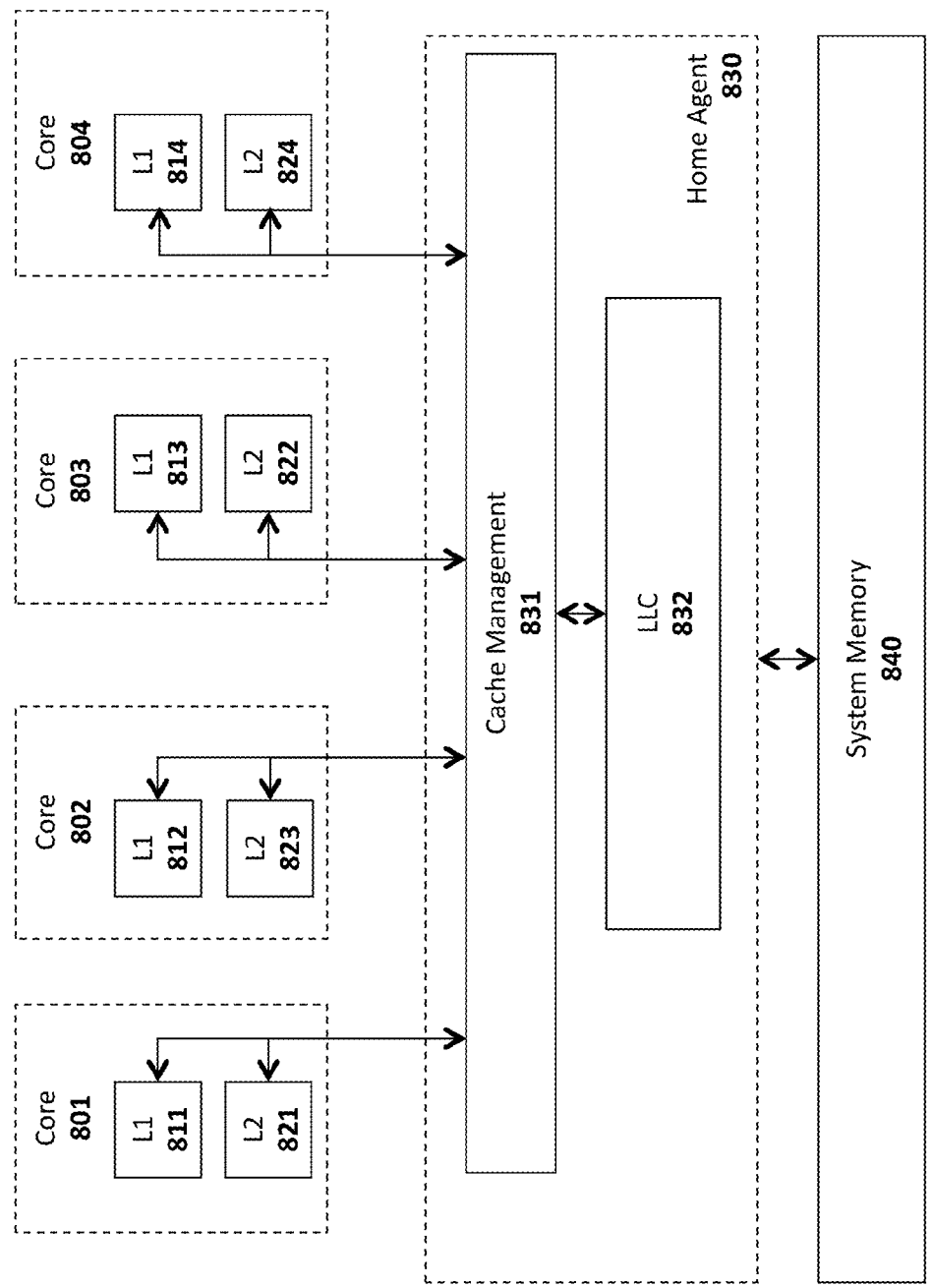
Figure 8C:
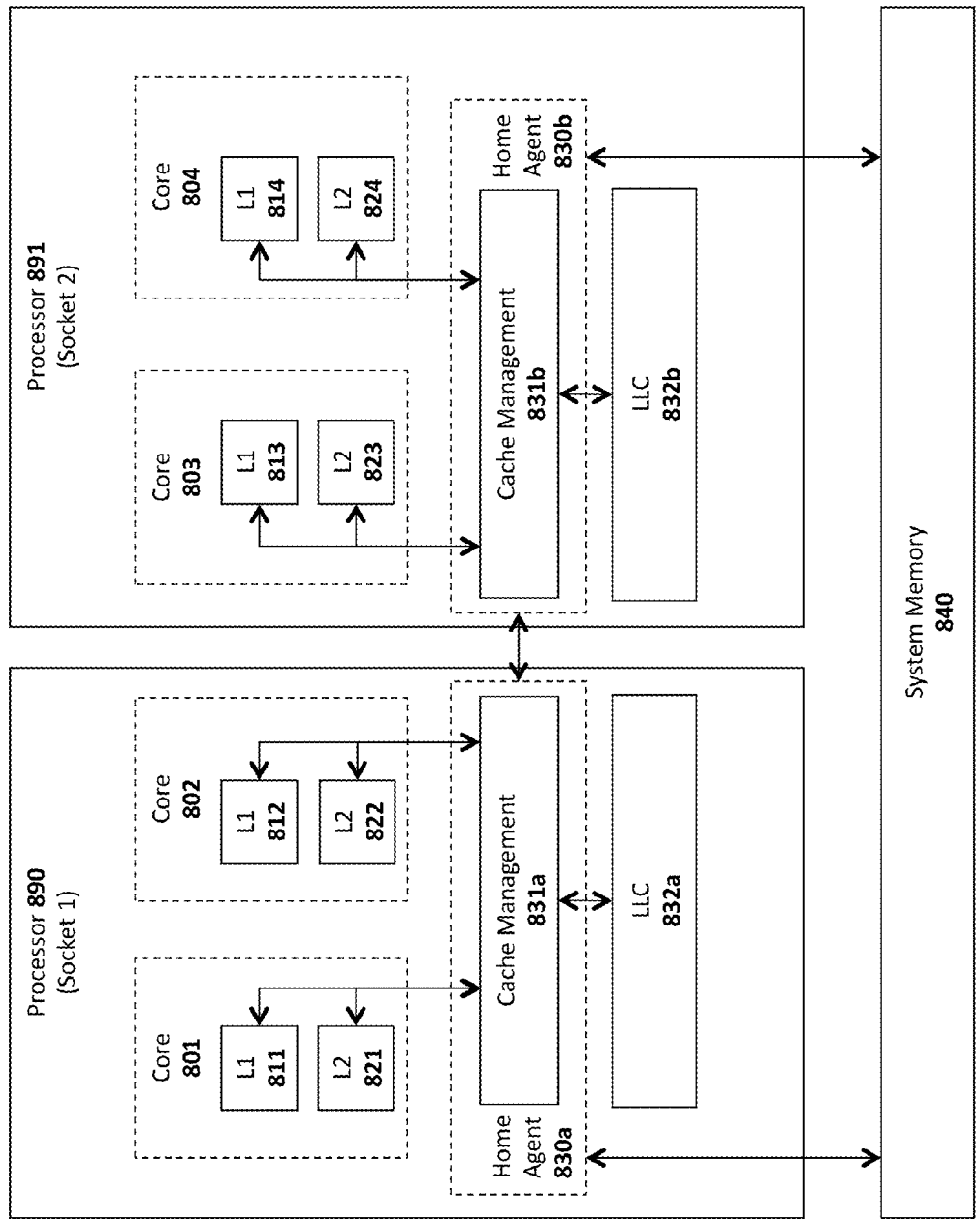

Embodiments of the invention described herein may be implemented on any type of computer architecture which utilizes a cache coherency protocol including those with multi-core processors and/or multi-processor systems. FIGS. 8A-C illustrate three exemplary embodiments of a system/processor architecture.

FIG. 8A illustrates a processor with six cores 801-806 each having a dedicated L 1 cache 811-816, respectively. The cores are logically grouped into modules 851-851 comprising two cores sharing a single L2 cache 821-823. The exemplary processor also includes a home agent 830 with cache management logic 831 for implementing the cache coherency techniques described herein; a lower level cache (LLC) (e.g., an L3 cache) and system memory 840. FIG. 8B illustrates another embodiment with four cores 801-804 but in this embodiment each of the cores 801-804 has a dedicated L2 cache 821-824. FIG. 8C illustrates yet another embodiment with multiple processors 890 and 891 (coupled to different system sockets as indicated). Processor 890 includes two cores 801-802 each having an L 1 cache 811-812 and L2cache 821-822, respectively; a home agent 830*a* with cache management logic 831*a* and a lower level cache (LLC) 832*a* . Similarly, processor 891 includes two cores 803-804 each with an L1cache 813-814 and L2 cache 823-824, respectively; a home agent 830b with cache management logic 831*b* and a LLC 832*a*.

In one embodiment, the home agent 830, 830*a-b* in FIGS. 8A-C includes cache management logic 831, 831*a-b* for implementing a cache coherency techniques described herein. In particular, the cache management logic 831, 831a-b manages the state of each of the cache lines utilizing a cache management protocol which, as described in detail below, combines the benefits of MOESI and MESIM' by adding an M' state to the MOESI protocol. Additionally, the home agent 830, 830a-b may couple the cores (and caches) to an interconnect such as a quick path interconnect (QPI) or other suitable type of interconnect to couple the cores 801-806 to a system memory 840 and/or other system components.

It should be noted, however, that the underlying principles of the invention are not limited to the specific processor architectures illustrated in FIGS. 8A-C. The embodiments of the invention described herein may be implemented within virtually any type of multi-core processor or multi-processor system.

Each of the cache levels shown in FIGS. 8A-C may include "caching agents" for communicating with the home agents to implement the cache management protocols described herein. For example, when a particular processor or core requires access to a cache line, the caching agent associated with the cache holding that cache line may enter into a transaction with the home agent to modify the state associated with the cache line (e.g., moving the state from "Modified" to "Invalid," etc). The terms "caching agent" and "cache" may be used interchangeably herein (e.g., when referring to a "peer" cache or a "requesting" cache as set forth below)

In multi-processor systems such as shown in FIG. 8C, cache coherence flows are architected and designed to manage the cross socket overhead in an efficient manner. The memory bandwidth (bandwidth to memory) and interconnect bandwidth (e.g., QPI) are typically at a premium and the specific architecture and/or implementation choices of cache coherence protocols define how well this bandwidth is utilized, the power efficiency of the component, and ultimately the delivered application performance.

The processing of non-ownership reads (loads, RdData (read data) transactions in QPI) that encounter modified data (Modified (M) state data or M-line) in a peer caching agent (CA) require special attention. When a read (Rd') request encounters a M-line in the local socket (e.g., processor 890 in Socket 1 in FIG. 8C), it is satisfied from the local cache without any additional actions external to the processor. For example, the CAs associated with caches 811-812 or 821-822 in FIG. 8C may satisfy the Rd request locally, without affecting the caches external to processor 890. However, when the 'Rd' encounters a M-line in a peer processor (e.g., processor 891), there are several options available:

Option 1. Downgrade the peer copy to Shared (S) state and forward a shared copy (S, F) to the requester while writing back the modified data to memory.

Option 2. The Owned (O) state (in processors which support it) allows multiple/simultaneous shares, while allowing one of the sharers to maintain a dirty but non-exclusive copy of the data. With O-state support, the peer copy is downgraded to Shared (S) and the cache line forwarded to the requester in the O state (where the requester then has the exclusive right to make changes to the cache line). No memory update is required.

Option 3. Downgrade the peer to the Invalid (I) state and forward the line to the requester in the Exclusive (E) state while writing back the modified data to memory. The E state indicates that this cache has the only valid copy of the line.

Option 4. Downgrade the peer to the I state and forward the line to the requester in the Modified' (M') state. No memory update is performed. The M' state is different from the Modified (M) state in that a subsequent non-ownership read to the line from a peer processor will result in downgrading the line to S state and forwarding a shared copy (S, F) to the requester while writing back the modified data to memory.

These options may be evaluated against certain factors to understand the benefits and drawbacks of each. One consideration is the behavior of each option on migratory data flows in which the sockets successively read and then write a shared address. In a migratory data scenario, the requestor will issue a data read that hits an M-line in a peer caching agent, which it will then later follow up with a write of its own. Flows of this sort are common in server workloads. The second item to consider is the degree to which each option is able to reduce the number of writes that get issued to memory when M-state cache lines are snooped by non-exclusive read requests ("iWBs"). This second item is relevant to both performance and power consumption.

Option 1 evaluates poorly on both of the metrics listed above. By providing the requestor that hits an M-line in the peer caching agent with an S copy, this option requires an additional ownership request be issued to the home agent 830 during migratory data flows (with corresponding invalidate transactions transmitted out to the other sockets in the system). In addition, it does nothing to reduce iWBs to memory since every non-exclusive read that hits an M-line in a peer caching agent will result in an immediate iWB.

Option 2 minimizes the iWBs since existence of an O-state enables the caching agents in the system to transition to sharing the line without requiring the dirty data be written back to memory first. But as with option 1, it still does nothing to aid with migratory data flows.

Option 3 is optimized for migratory data flows. Providing an E-state copy of the line to the first reader enables the reader to immediately write the line if it wishes without having to request ownership again. However, like option 1, option 3 does nothing to reduce iWBs to memory since every non-exclusive read that hits an M-line in a peer caching agent must trigger an immediate iWB to enable the transition to E-state at the requestor.

Option 4 is a variant of option 3 that is able to avoid the initial iWB to memory by forwarding a modified copy to the first reader, and only transitioning to a non-dirty state if a second reader comes along before the first reader modifies its exclusive copy of the data a second time. When a read data (RdData) transaction encounters a peer M-state, the peer is downgraded to I and the line forwarded in the M-state to the requester (no iWB is required). However, the line is filled into the requester in a M' state where M' behaves exactly like an M-line from a coherence perspective, except that it additionally signifies that the line was forwarded in an M state in response to a RdData request. The M'/M distinction enables the system to handle the next reader differently and avoids the weakness of an endlessly ping-ponging of stale M-state data which is would occur if an ordinary M-state was used by the reader. If the RdData from the first reader is followed by another remote RdData request, this second RdData encounters a M' line in the first requester's LLC (as opposed to M). The actions outlined in option 1 above are then followed, i.e., downgrade the present owner to S, and forward a shared (S, F) copy to the requester along with a iWB. Hence, option 4 both handles the migratory data flow cleanly, without degenerating to an endless ping-ponging of the M-state if the threads keep sharing but stop writing the line, while also delaying the iWB until the second reader. Option 4 is then able to eliminate the iWB completely, but only if the first reader also writes the line.

However, for workloads that have more readers than writers of the shared lines, no iWBs are eliminated.

One embodiment of the invention provides an additional improvement upon the above options that eliminates all iWBs to memory, without sacrificing any of the benefits that Option 4 provides on migratory data flows. In one embodiment, when a RdData encounters a peer M-state, the flow of option 4 is initially followed, placing an M' copy of the line in the requestor's cache. However, if another reader makes a request before the first reader re-modifies the line, the inclusion of the O-state enables the system to transition to sharing the line without writing the dirty copy out to memory, thereby enabling the same reduction in iWB as Option 2.

Figure 10:
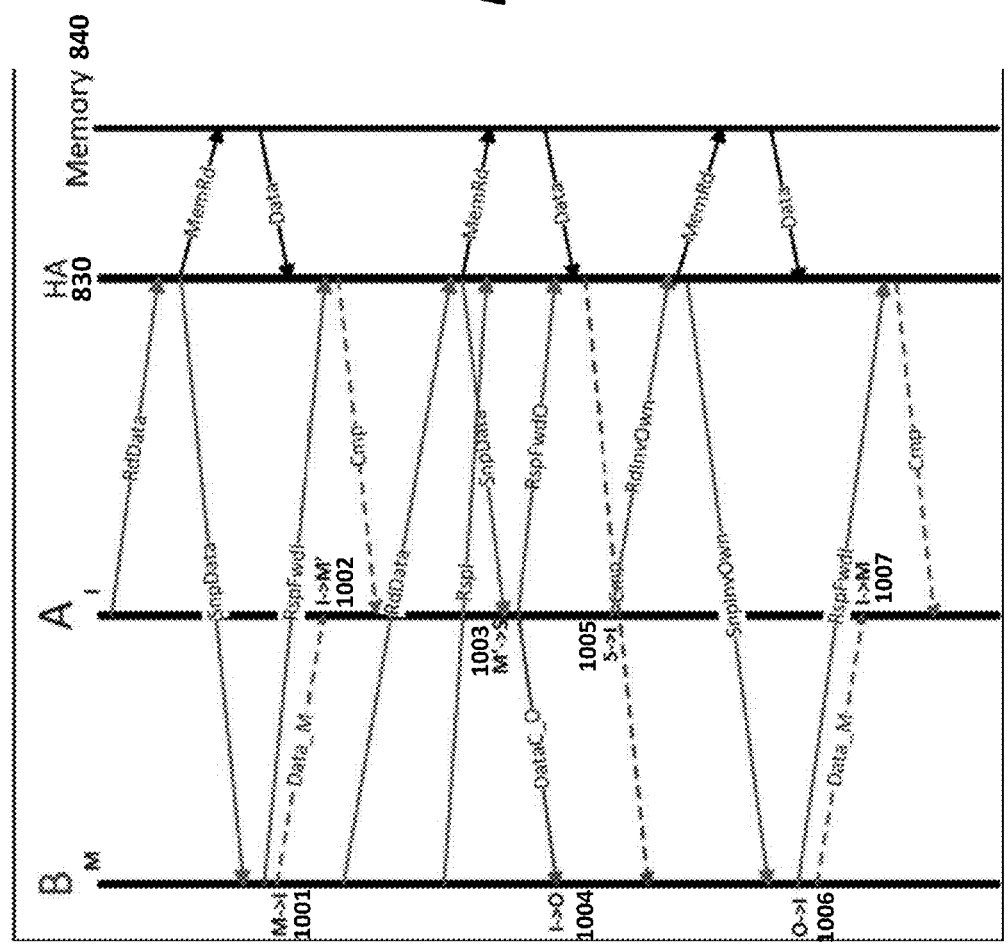
FIG. 10 is a transaction diagram illustrating one embodiment of an MESIM'O implementation.

FIGS. 9-10 illustrate a series of transactions between a first caching agent (A) a second caching agent (B) (potentially in a different processor from A) a home agent 830 and a memory 840. The MESIM' protocol is implemented in FIG. 9 and a MESIM'O cache coherency protocol in accordance with one embodiment of the invention is implemented in FIG. 10.

Referring first to FIG. 9, the cache line is initially within cache A in the invalid (I) state and within cache B in the modified (M) state, as indicated. In response to a read data (RdData) request from cache A, the home agent 830 sends a snoop data (SnpData) signal to cache B which changes the cache line from the M state to the I state at 901 and forwards a copy of the cache line (Data_M) to cache A which transitions the line from the I state to the M' state at 902. The M' state is sometimes referred to herein as a "second modified" state while the M state is simply referred to as the "modified" state, or the "first modified" state.

In response to a subsequent RdData request for the line from cache B, the home agent 830 sends a SnpData signal to cache A which transitions the cache line from the M' state to the shared (S) state and forwards a copy of the cache line (DataC_S/F) to cache B which transitions the line from the I state to the shared/forwarded (S/F) state at 904.

In response to a subsequent request for ownership of the cache line from cache A (RdInvOwn), cache A transitions the line from the S state to the I state, the home agent 830 sends a snoop signal to cache B, which transitions the cache line from the S state to the I state at 906. Upon receiving the response from cache B, the home agent 830 sends an indication to cache A that it is now the exclusive owner of the cache line. Thus, cache A transitions the cache line from the I state to the E state at 907.

FIG. 9 may be contrasted with FIG. 10 which illustrates one embodiment of a MESIM'O cache coherency protocol. The cache line is initially within cache A in the invalid (I) state and within cache B in the modified (M) state, as indicated. In response to a read data (RdData) request from cache A, the home agent 830 sends a snoop data (SnpData) signal to cache B which changes the cache line from the M state to the I state at 1001 and forwards a copy of the cache line (Data_M) to cache A which transitions the line from the I state to the M' state at 1002.

In response to a subsequent RdData request for the line from cache B, the home agent 830 sends a SnpData signal to cache A which transitions the cache line from the M' state to the shared (S) state at 1003 and forwards a copy of the cache line (DataC_O) to cache B. However, in this embodiment, cache B transitions the cache line from the I state to the Owned (O) state at 1004 (rather than the S/F state).

In response to a subsequent request for the cache line from cache A (RdInvOwn), cache A transitions the line from the S state to the I state, the home agent 830 sends a snoop signal to cache B (SnoopInvOwn), which transitions the cache line from the O state to the I state at 1006. Cache B then forwards the data directly to cache A (Data_M) which transitions the cache line from the I state to the M state at 1007.

Thus, this embodiment eliminates all iWBs to memory, without sacrificing any of the benefits that Option 4 above provides on migratory data flows. When a RdData encounters a peer M-state, the flow of option 4 is initially followed, placing an M' copy of the line in the requestor's cache (at 1002 in FIG. 10). However, if another reader makes a request before the first reader re-modifies the line, the inclusion of the O-state (at 1004 in FIG. 10) enables the system to transition to sharing the line without writing the dirty copy out to memory, thereby enabling the same reduction in iWB as Option 2.

Figure 11:
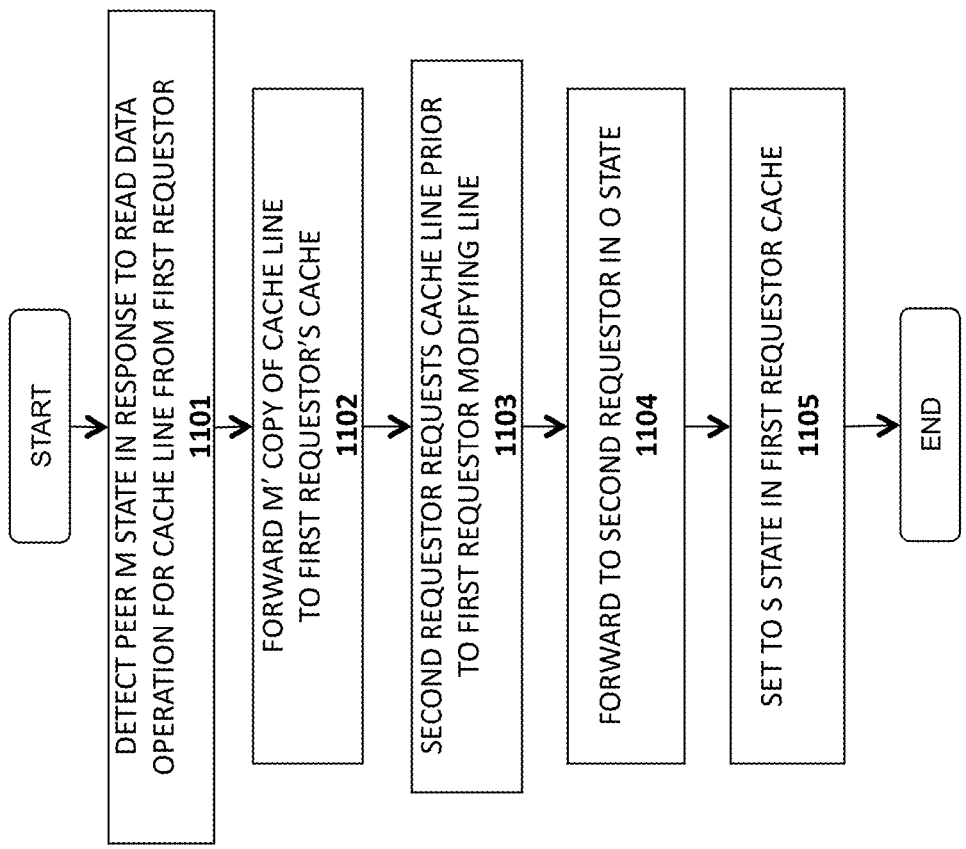
FIG. 11 illustrates one embodiment of a method for a MESIM'O cache coherency implementation.

One embodiment of a method is illustrated in FIG. 11. The illustrated method may be implemented on any of the processor/system architectures shown in FIGS. 8A-C, but is not limited to any particular architecture.

At 1101, in response to a read data (RdData) operation directed to a particular cache line, a peer M state for the cache line is detected (i.e., the line exists in a peer cache in a modified state). In response, at 1102, an M' copy of the cache line is forwarded to the first requestor's cache. At 1103, a second requestor requests the cache line before the line is modified by the first requestor. In response, the cache line is forwarded to the second requestor in an owned (O) state and, at 1105, the cache line is set to the shared (S) state in the first requestor's cache. Consequently, transitioning to the O state in this situation allows the cache line to be shared without writing the dirty copy out to memory, thereby preserving memory bandwidth.

An additional optimization may be employed with respect to the memory reads shown when the Read Data request (RdData) arrives at the home agent 830 in both FIGS. 9 and 10. These data reads are required to retrieve the directory state for the cache line when the request arrives at the home agent 830, and also to ensure a copy of the data is available in the event that none of the peer caching agents forward data to the requestor.

Figure 12:
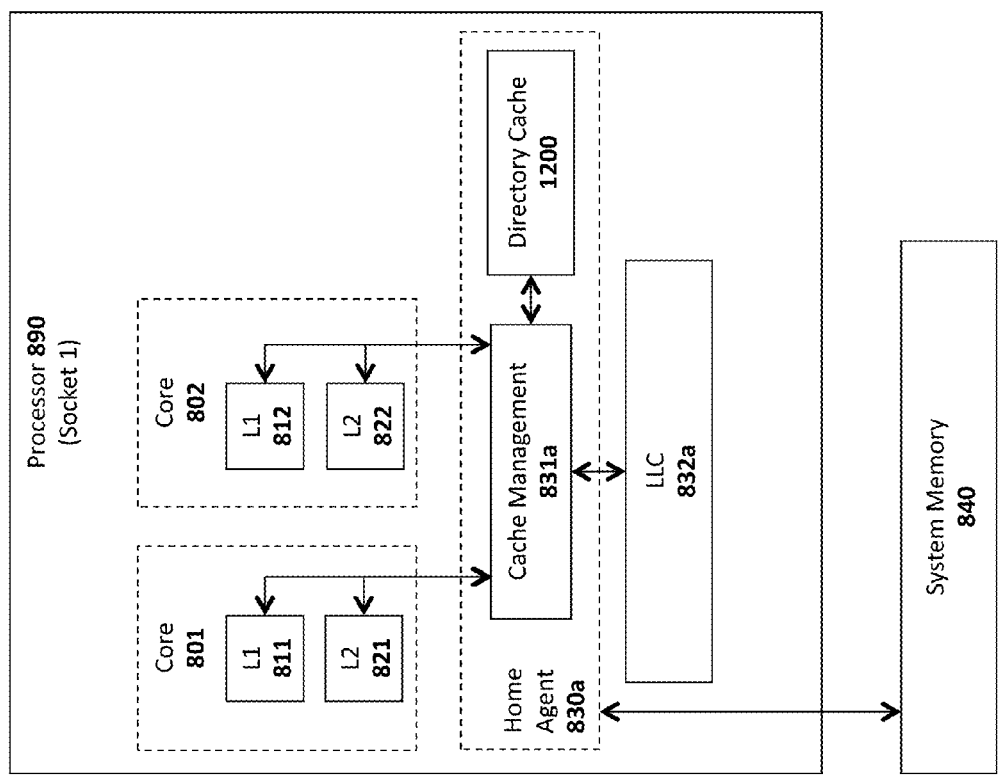
FIG. 12 illustrates one embodiment of a home agent with a directory cache.

As illustrated in FIG. 12, one embodiment of the home agent 830a implements a directory cache 1200 which stores and maintains an indication as to whether each cache line is cached exclusively by a remote caching agent without requiring a read of the directory bits in memory. The existence of the directory cache 1200 increases the benefits of the M'O state even further. In one embodiment, the cache management logic 831a updates the directory cache 1200 with the identification code of the caching agent (e.g., the caching agent Node ID) that has the modified copy of the line based on the reception of the RspFwdI (RdData HitM) or RspFwdO (RdData HitM' or HitO) indications. These responses indicate that the line is not just exclusive but has been modified in a processor cache, which allows the home agent 830a to assume that the line cannot be dropped silently by the processor cache without first issuing a write back to the home agent 830a. This enables a directed snoop message to be sent only to the caching agent which has the M' or O state copy of the line when the incoming request is a non-ownership request (ownership requests may still require a snoop broadcast). In one embodiment, the S state lines are changed to the I state (invalidated) while the O state caching agent forwards M data to the requestor. Since a cache-to-cache transfer of the cache line to the requestor is guaranteed in such a case, the initial read of the memory at the home agent is not required.

FIGS. 13A-B illustrate this functionality for MESIM' and MESIM'O, respectively. Note the reduction in traffic between the home agent and memory as the result of directory hits 1301-1303 (for MESIM' in FIG. 13A) and 1311-1313 (for MESIM'O in FIG. 13B). Note also that MESIM'O in FIG. 13B has no memory accesses at all (e.g., when the caching agents in the system keep the line cached).

There are numerous benefits realized by the embodiments described herein for any system/processor implementation, particularly those with large caches and coherent sharing of data across the caches. By way of example, and not limitation, multi-threaded server workloads that frequently share data would realize particularly significant gains in performance.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
   detecting a first operation associated with a cache line at a first requestor cache, the cache line being a block of date;
   detecting that a copy of the cache line exists in a first cache in a modified (M) state;
   forwarding the copy of the cache line from the first cache to the first requestor cache and storing the copy of the cache line in the first requestor cache in a second modified (M') state;
   transitioning the copy of the cache line in the first cache to an invalid (I) state;
   detecting a second operation associated with the cache line at a second requestor cache;
   responsively forwarding the copy of the cache line from the first requestor cache to the second requestor cache and storing the copy of the cache line in the second requestor cache in an owned (O) state if the copy of the cache line has not been modified in the first requestor cache; and
   setting the copy of the cache line to a shared (S) state in the first requestor cache.

2. The method as in claim 1 wherein the M' state indicates that a cache line has been modified in the first cache and read into the first requestor cache but has not yet been written back to memory.

3. The method as in claim 1 wherein the O state indicates that the second requestor cache has one of several valid copies of the cache line, but has the exclusive right to make changes to it.

4. The method as in claim 3 wherein the S state indicates that the first requestor cache has a shared copy of the cache line but do not currently have the right to make changes to it.

5. The method as in claim 1 wherein the first cache, the first requestor cache, and the second requestor cache are peer caches.

6. The method as in claim 5 wherein the first cache, the first requestor cache, and the second requestor cache are either all level 1 (L1) caches or all Level 2 (L2) caches.

7. The method as in claim 1 further comprising:
   storing and maintaining a directory cache to provide an indication as to whether the cache line is cached exclusively in a cache without requiring a read of directory bits from memory.

8. The method as in claim 1 wherein the first cache is located on a different processor from the first requestor cache, and/or the first requestor cache is located on a different processor from the second requestor cache, and/or the first cache is located on a different processor from the second requestor cache.

9. The method as in claim 1 wherein the first cache is located on a different core from the first requestor cache, and/or the first requestor cache is located on a different core from the second requestor cache, and/or the first cache is located on a different core from the second requestor cache.

10. The method as in claim 1 wherein each of the first cache, first requestor cache, and second requestor cache comprise caching agents communicating with a home agent.

11. A processor comprising:
    a first caching agent to detect a first operation associated with a cache line at a first requestor cache, wherein the cache line being a block of data, and further detecting that a copy of the cache line exists in a first cache in a modified (M) state;

a second caching agent to forward the copy of the cache line from the first cache to the first requestor cache, the first caching agent to store the copy of the cache line in the first requestor cache in a second modified (M') state, and the second caching agent further to transition the copy of the cache line in the first cache to an invalid (I) state;

a third caching agent to detect a second operation associated with the cache line at a second requestor cache;

the first caching agent to responsively forward the copy of the cache line from the first requestor cache to the third caching agent, the third caching agent to store the copy of the cache line in the second requestor cache in an owned (O) state if the copy of the cache line has not been modified in the first requestor cache; and the first caching agent to transition the copy of the cache line to a shared (S) state in the first requestor cache.

12. The processor as in claim 11 wherein the M' state indicates that a cache line has been modified in the first cache and read into the first requestor cache but has not yet been written back to memory.

13. The processor as in claim 11 wherein the O state indicates that the second requestor cache has one of several valid copies of the cache line, but has the exclusive right to make changes to it.

14. The processor as in claim 13 wherein the S state indicates that the first requestor cache has a shared copy of the cache line but do not currently have the right to make changes to it.

15. The processor as in claim 11 wherein the first cache, the first requestor cache, and the second requestor cache are peer caches.

16. The processor as in claim 15 wherein the first cache, the first requestor cache, and the second requestor cache are either all level 1 (L1) caches or all Level 2 (L2) caches.

17. The processor as in claim 11 further comprising:
a directory cache to provide an indication as to whether the cache line is cached exclusively in a cache without requiring a read of directory bits from memory.

18. The processor as in claim 11 wherein the first cache is located on a different core from the first requestor cache, and/or the first requestor cache is located on a different core from the second requestor cache, and/or the first cache is located on a different core from the second requestor cache.

19. A system comprising:
a memory for storing instructions and data;
a graphics processor for performing graphics operations in response to certain instructions;
a network interface for receiving and transmitting data over a network; and
a processor comprising:
a first caching agent to detect a first operation associated with a cache line at a first requestor cache, wherein the cache line being a block of data, and further detecting that a copy of the cache line exists in a first cache in a modified (M) state;
a second caching agent to forward the copy of the cache line from the first cache to the first requestor cache, the first caching agent to store the copy of the cache line in the first requestor cache in a second modified (M') state, and the second caching agent further to transition the copy of the cache line in the first cache to an invalid (I) state;
a third caching agent to detect a second operation associated with the cache line at a second requestor cache;
the first caching agent to responsively forward the copy of the cache line from the first requestor cache to the third caching agent, the third caching agent to store the copy of the cache line in the second requestor cache in an owned (O) state if the copy of the cache line has not been modified in the first requestor cache; and
the first caching agent to transition the copy of the cache line to a shared (S) state in the first requestor cache.

* * * * *